Figure 1:
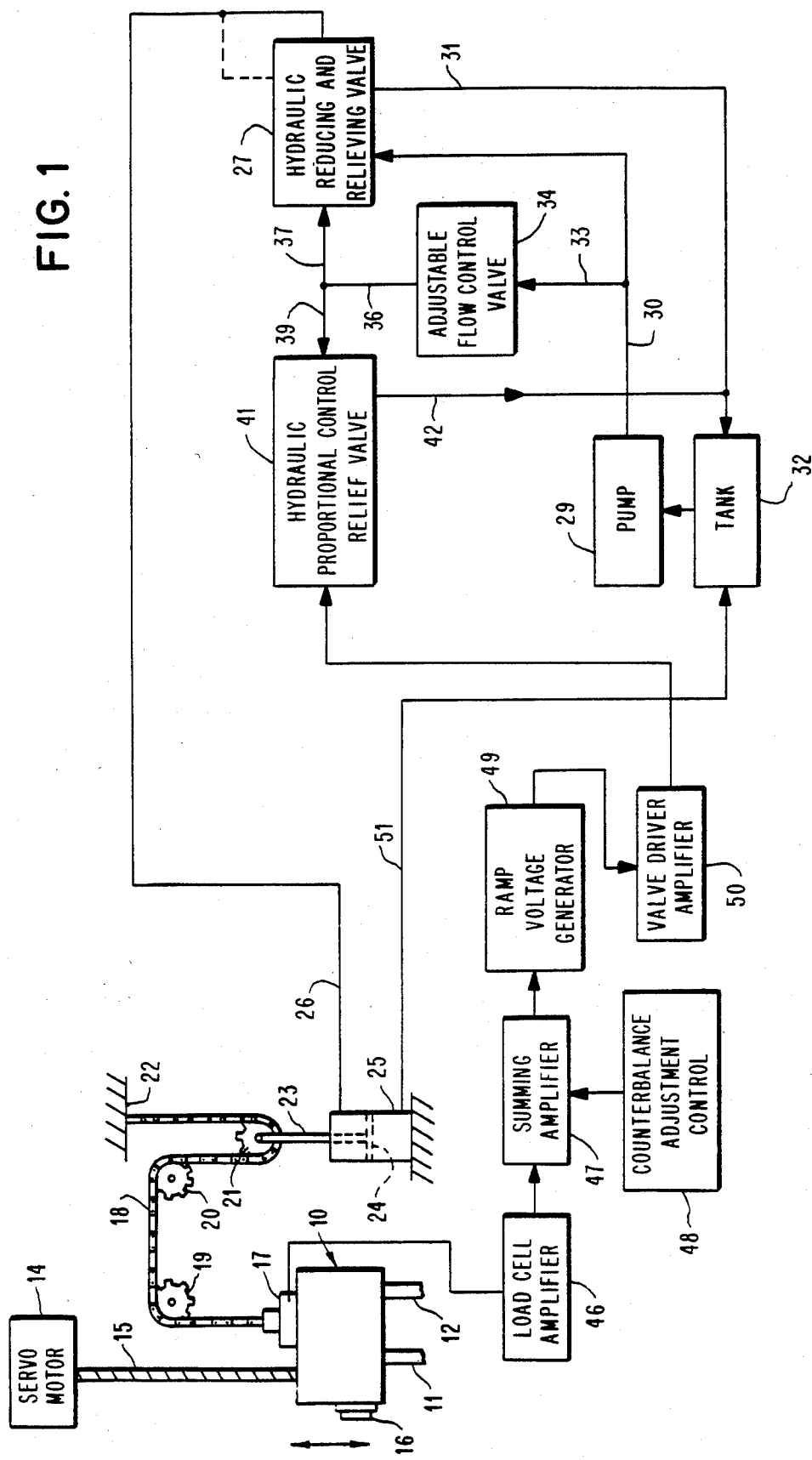

United States Patent [19]

Berchtold et al.

[11] Patent Number: 4,807,518

[45] Date of Patent: Feb. 28, 1989

[54] COUNTERBALANCE MECHANISM FOR VERTICALLY MOVABLE MEANS

[75] Inventors: Merrill E. Berchtold, Loveland; John R. Witzel, Goshen, both of Ohio

[73] Assignee: Cincinnati Milacron Inc., Cincinnati, Ohio

[21] Appl. No.: 918,427

[22] Filed: Oct. 14, 1986

[51] Int. Cl.[4] .............................................. F15B 31/16
[52] U.S. Cl. ....................................... 91/421; 91/361; 91/364
[58] Field of Search ................ 91/421, 361, 364, 459, 91/461

[56]  References Cited
U.S. PATENT DOCUMENTS 3,398,650  8/1968  Garnjost ............................. 91/421
4,202,247  5/1980  Hunkar et al. ...................... 91/459
4,202,250  5/1980  Zeuner et al. ...................... 91/459

Primary Examiner—A. Michael Chambers
Attorney, Agent, or Firm—Thomas M. Farrell; Frank C. Leach

[57] ABSTRACT

A spindle carrier, which is movable vertically by an electric servo motor through a relatively long ball screw, has a substantially constant counterbalance force maintained on it irrespective of whether it is moving up or down. This prevents compression or tension of the ball screw. The counterbalance force is maintained substantially constant through sensing the load on the spindle carrier and using the sensed load to vary the hydraulic pressure applied to a piston within a hydraulic cylinder and connected through a chain to the spindle carrier to apply the counterbalance force.

24 Claims, 2 Drawing Sheets

COUNTERBALANCE MECHANISM FOR VERTICALLY MOVABLE MEANS

This invention relates to a counterbalance mechanism for vertically movable means and, more particularly, to a counterbalance mechanism for a vertically movable spindle carrier of a machine tool.

A numerically-controlled machine tool has a spindle carrier movable along a vertical or Y axis by an electric servo motor. The spindle carrier is movable along vertical ways of the machine tool and is connected to the electric servo motor through a relatively long axially-fixed ball screw having a length such as one hundred inches, for example. With the spindle carrier weighing 24,000 pounds, for example, a relatively large load is placed on the ball screw so that it is stretched to a degree by the weight of the spindle carrier which is mounted to a ball nut that may travel the length of the ball screw.

To minimize the stretch or compression of the ball screw, and to assist the servo motor in moving the spindle carrier, a counterbalance mechanism is used with the spindle carrier. One previous counterbalance mechanism has attached one end of a chain to the spindle carrier, passed the chain around sprockets, and secured the other end of the chain to a fixed structure. One of the sprockets has been attached to a piston rod of a piston slidable within a hydraulic cylinder. By applying hydraulic fluid under pressure to the side of the piston attached to the piston rod, a counterbalance force has been applied to the spindle carrier.

This counterbalance mechanism has enabled the spindle carrier to be moved by the electric servo motor. However, when the spindle carrier has been moved downwardly by the electric servo motor, the upward movement of the piston within the cylinder has caused an increase in the hydraulic pressure to cause a compression of the ball screw. When the spindle carrier has been moved upwardly by the electric servo motor, the downward movement of the piston in the hydraulic cylinder has caused a decrease in the hydraulic pressure to produce a tension on the ball screw.

With the ball screw having a length of about one hundred inches, this extension or contraction of the ball screw can substantially affect the position to which the spindle carrier is moved by the electric servo motor. Thus, the desired precise positioning of the spindle carrier in which it is sought to position the spindle carrier within 0.0005", for example, is not obtained.

The pressure of the hydraulic fluid acting on the piston has been controlled previously through a hydraulic reducing and relieving valve. This has supplied additional fluid to the cylinder when the spindle carrier was raised and relieved the pressure when the spindle carrier was lowered. However, this has created a pressure differential of 100-150 p.s.i. whereby the counterbalance force has not been substantially constant so as to affect the desired precise positioning of the spindle carrier.

Additionally, this prior system has both hydraulic and mechanical inefficiencies. The mechanical inefficiencies have included the friction of the chain at the sprockets, movement of the spindle carrier along the ways, and the hydraulic piston sliding in the cylinder. Hydraulic inefficiencies include the inability to maintain the counterbalance pressure substantially constant.

Thus, while the previous system has provided a counterbalance force to enable the spindle carrier to be moved by the electric servo motor, it has not produced a substantially constant counterbalance force. As a result, there has not been the precise positioning of the spindle carrier that is required by a numerically controlled machine tool.

In the previous system, the variation of hydraulic pressure always acts in the wrong direction to maintain a substantially constant counterbalance force. That is, the hydraulic pressure increases when it is desired to decrease and vice versa.

The counterbalance mechanism of the present invention uses the prior counterbalance mechanism and adds control means thereto to maintain a substantially constant force on the spindle carrier. This is accomplished through continuously sensing the load on the spindle carrier and utilizing a signal proportional to the load to produce an electric signal of a varying amplitude depending on the load to control the hydraulic pressure supplied from the hydraulic reducing and relieving valve to the hydraulic cylinder. The hydraulic reducing and relieving valve is controlled through a hydraulic proportional control relief valve, which is responsive to the electric signal that is proportional to the load on the spindle carrier, changing the pressure on a pilot operator of the hydraulic reducing and relieving valve.

An object of this invention is to provide a mechanism for maintaining a substantially constant counterbalance force on a vertically movable member irrespective of its direction of movement.

Another object of this invention is to provide a mechanism for maintaining a substantially constant tension on a vertically movable spindle carrier irrespective of its direction of movement.

A further object of this invention is to provide a counterbalance mechanism to enable precise positioning of a vertically moving spindle carrier through an elongate ball screw by minimizing further elongation of the screw.

Other objects of this invention will be readily perceived from the following description, claims, and drawings.

This invention relates to the combination of vertically movable means and motive means connected thereto to move the vertically movable means. Counterbalance means is connected to the vertically movable means for exerting a counterbalance force on the vertically movable means as the vertically movable means is moved in either vertical direction by the motive means. The counterbalance means is controlled by control means to cause the counterbalance means to exert a substantially constant force on the vertically movable means.

Figure 2:
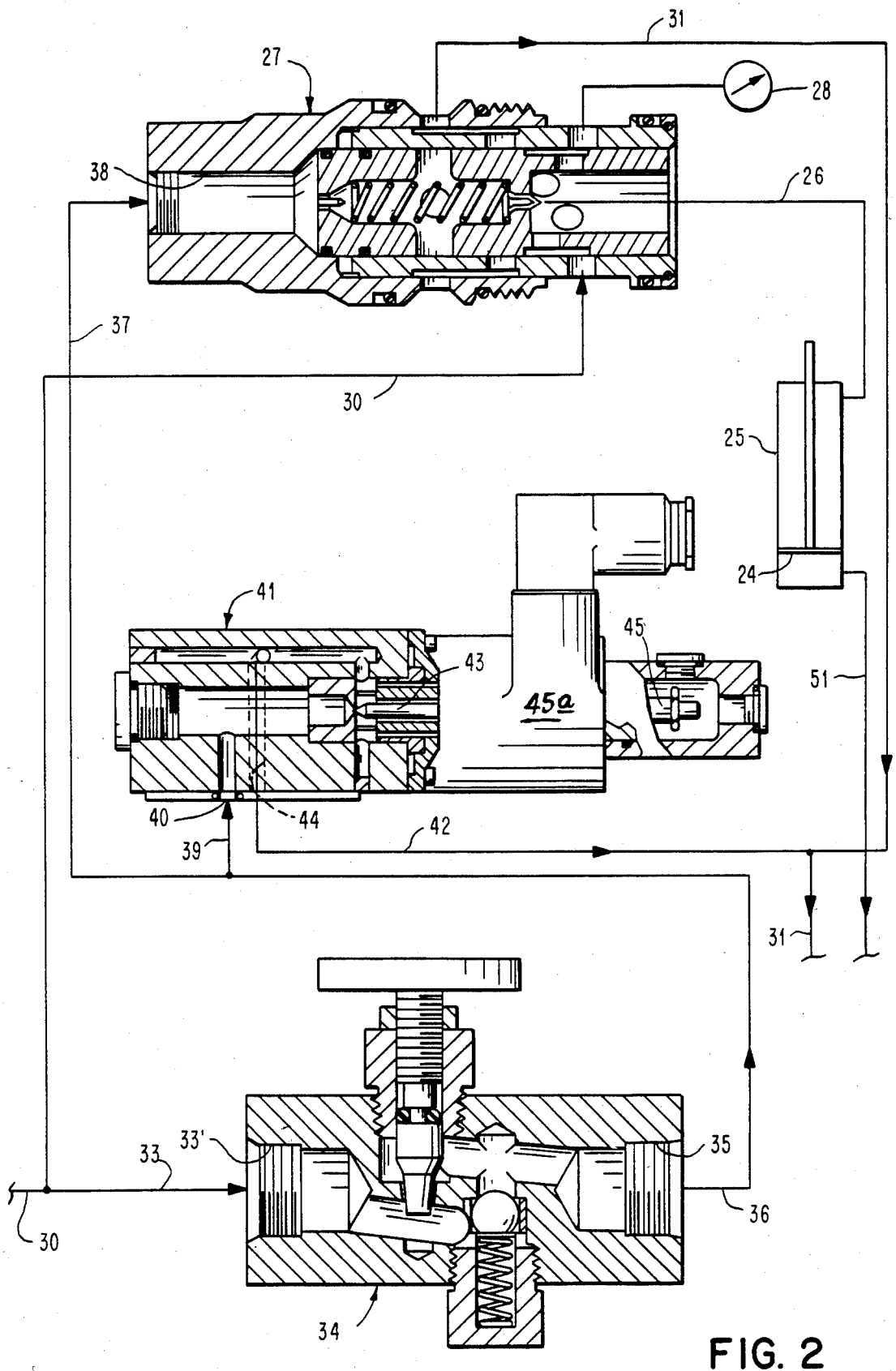

The attached drawings illustrate a preferred embodiment of this invention, in which:

FIG. 1 is a schematic diagram of the counterbalance mechanism of the present invention used with a machine tool; and FIG. 2 is a schematic view, partly in section, of the hydraulic portion of FIG. 1 in more detail.

Referring to the drawings and particularly FIG. 1, there is shown a spindle carrier 10 movable along vertical ways 11 and 12 of a numerically controlled machine tool. The spindle carrier 10 is driven by an electric servo motor 14 in both directions along the vertical ways 11 and 12. The motor 14 is connected by a ball screw 15 to the spindle carrier 10 in the well-known manner to convert the rotation of the motor 14 into linear motion of the spindle carrier 10. The spindle carrier 10 has a cutting tool mounted within a spindle 16 for rotation about its central, or "Z" axis.

The spindle carrier 10 has a load cell 17 attached thereto to sense the load on the spindle carrier 10. One suitable example of the load cell 17 is thin profile load cell sold by Sensotec, Columbus, Ohio as model No. 41 with a capacity of 50,000 pounds. The load cell 17 has a strain gage to sense the load and converts the sensed load into an electrical signal proportional to the load on the spindle carrier 10.

Counterbalance force on the spindle carrier 10 is applied through a chain 18 having one end attached to the load cell 17. The chain 18 extends around sprockets 19, 20, and 21 and has its other end attached to a fixed column 22 of the numerically controlled machine tool. While the sprockets 19 and 20 are rotatably supported by fixed structure of the numerically controlled machine tool, the sprocket 21 is rotatably mounted on the upper end of a piston rod 23 having a piston 24 slidably disposed within a hydraulic cylinder 25. Hydraulic fluid is supplied and removed from the cylinder 25 above the piston 24 through a line 26.

The pressure of the hydraulic fluid in the line 26 is controlled by a hydraulic reducing and relieving valve 27, which has a gage 28 (see FIG. 2) for sensing the pressure supplied to the line 26. The valve 27 receives the hydraulic fluid at a fixed pressure from a hydraulic pump 29 (see FIG. 1), which is preferably a variable displacement pump, through a supply line 30. The hydraulic reducing and relieving valve 27 has an exhaust line 31, which returns to a tank 32 for the hydraulic pump 29.

One suitable example of the hydraulic reducing and relieving valve 27 is a pressure reducing valve sold by Sun Hydraulics Corporation, Sarasota, Fla. as part No. 8602-101-A02. Any other suitable hydraulic reducing and relieving valve may be employed.

The position of the hydraulic reducing and relieving valve 27 is controlled by pilot pressure. The hydraulic pump 29 is connected through the line 30 and a line 33 to an inlet flow port 33′ (see FIG. 2) of an adjustable flow control valve 34, which reduces the pressure from the pump 29 (see FIG. 1) for supply as the pilot pressure to the hydraulic reducing and relieving valve 27.

One suitable example of the adjustable flow control valve 34 is a flow control valve sold by Pneutrol Division of the Deltrol Corp., Bellwood, Ill. as model No. F-20. Any other suitable adjustable flow control valve may be employed.

The adjustable flow control valve 34 has its outlet flow port 35 (see FIG. 2) connected by lines 36 and 37 to a pilot port 38 of the hydraulic reducing and relieving valve 27. This is the pilot pressure as initially set by the position of the adjustable flow control valve 34.

The outlet flow port 35 of the adjustable flow control valve 34 is not only connected to the pilot port 38 but also through the line 36 and a line 39 to a pressure port 40 of a hydraulic proportional control relief valve 41. One suitable example of the hydraulic proportional control relief valve 41 is a proportional relief valve sold by Parker Hannifin Corporation as model DSA-A-1007ELBF. Any other suitable hydraulic proportional relief valve may be employed.

The hydraulic proportional control relief valve 41 is connected through an exhaust line 42 to the exhaust line 31 to enable dumping of hydraulic fluid back to the tank 32 (see FIG. 1) in accordance with the amount of opening of a needle valve 43 (see FIG. 2) of the hydraulic proportional control relief valve 41. The position of the needle valve 43 determines the amount of hydraulic fluid flowing from the pressure port 40 to a tank port 44, which is connected to the exhaust line 42. This changes the pilot pressure acting at the pilot port 38 of the hydraulic reducing and relieving valve 27 since the adjustable flow control valve 34 has a fixed pressure drop at its outlet flow port 35 for a particular flow setting.

The position of the needle valve 43 of the hydraulic proportional control relief valve 41 is controlled with a movable core 45 of a solenoid 45a of the hydraulic proportional control relief valve 41, in accordance with the signal from the load cell 17 (see FIG. 1). As the signal from the load cell 17 decreases to indicate a decreased load on the spindle carrier 10, the opening controlled by the position of the needle valve 43 (see FIG. 2) is reduced to increase the pilot pressure at the pilot port 38 whereby the hydraulic reducing and relieving valve 27 opens further to increase the hydraulic pressure acting on the piston 24 to compensate for the decreased load on the spindle carrier 10 (see FIG. 1). As the signal from the load cell 17 increases to indicate an increased load on the spindle carrier 10, the opening controlled by the position of the needle valve 43 (see FIG. 2) is increased to reduce the pilot pressure at the pilot port 38 whereby the hydraulic reducing and relieving valve 27 closes further to decrease the hydraulic pressure acting on the piston 24 to compensate for the increased load on the spindle carrier 10 (see FIG. 1).

The electrical signal from the load cell 17 is supplied to a load cell amplifier 46. One suitable example of the load cell amplifier 46 is a load cell amplifier sold by Action Instruments Company, Inc., San Diego, Calif. as model AP 4251-209.

The output of the load cell amplifier 46 is supplied to a summing amplifier 47 which is part of a feedback and summing card sold by the Fluid Power group, Parker Hannifin Corporation, Cincinnati, Ohio as model No. AF 10. The summing amplifier 47 also has a voltage supplied thereto by a counterbalance adjustment control 48. The counterbalance adjustment control 48 is preferably a trim potentiometer movable to provide between zero volts (0 pounds) and ten volts (50,000 pounds) to the summing amplifier 47. For this application, the 0 pounds and 50,000 pounds are used for calibrating the output of the load cell amplifier 46.

The output of the summing amplifier 47 is supplied to a ramp generator 49, which is also part of the feedback and summing card. The output of the ramp generator 49 is supplied to a valve driver amplifier 50, which is part of a valve driver card sold as model ED-00102D by the Fluid Power group, Parker Hannifin Corporation, Cincinnati, Ohio.

The counterbalance adjustment control 48 sets the voltage applied to the summing amplifier 47 so that the output of the summing amplifier 47 is zero for a specific tension at the load cell 17. The ramp generator 49 has its output voltage controlled by the output of the summing amplifier 47. The ramp generator output voltage will remain stationary only when the output of the summing amplifier 47 is zero so as to maintain this specific tension at the load cell 17.

This specific tension is when the current in the servo motor 14 is the same for either direction of vertical motion of the spindle carrier 10 when moving the spindle carrier 10. The pressure gage 28 (see FIG. 2) will show what this hydraulic pressure is so that it is not necessary to check the current of the servo motor 14 (see FIG. 1) after initially ascertaining the hydraulic pressure in the supply line 26 when the current in the servo motor 14 is the same for both directions of vertical motion of the spindle carrier 10.

The change in output of the load cell amplifier 46 causes an increase or decrease in the voltage output of the summing amplifier 47. This causes the ramp generator 49 to increase or decrease in voltage output to change the position of the needle valve 43 (see FIG. 2) of the hydraulic proportional control relief valve 41 by changing the position of the solenoid core 45 connected to the needle valve 43.

Accordingly, a substantially constant counterbalance force is applied to the spindle carrier 10 (see FIG. 1). This is accomplished through maintaining the tension at the load cell 17 substantially constant. Variation of the hydraulic pressure supplied to the hydraulic cylinder 25, which has an exhaust line 51 to the tank 32 from beneath the piston 24, causes the substantially constant tension to be maintained at the load cell 17 so that a substantially constant counterbalance force is applied to the spindle carrier 10.

The hydraulic pressure is increased to the cylinder 25 when the tension at the load cell 17 decreases. When the tension at the load cell 17 increases, the hydraulic pressure supplied to the cylinder 25 decreases.

While the spindle carrier 10 has been described as being part of a numerically controlled machine tool, it should be understood that the spindle carrier may be part of a non-numerically controlled machine tool.

While the counterbalance mechanism has been described with respect to the spindle carrier 10, it should be understood that the counterbalance mechanism may be used with any vertical movable means.

An advantage of this invention is that the hydraulic and mechanical inefficiencies are overcome. Another advantage of this invention is that it maintains constant counterbalance force.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A machine tool including:
   a vertically movable spindle carrier;
   motive means connected to said spindle carrier to move said spindle carrier vertically in either vertical direction;
   counterbalance means connected to said spindle carrier for exerting a counterbalance force on said spindle carrier in only one vertical direction as said spindle carrier is moved in either vertical direction by said motive means;
   and control means for controlling said counterbalance means to cause said counterbalance means to exert a substantially constant counterbalance force on said spindle carrier in only the one vertical direction irrespective of the direction of vertical movement of said spindle carrier.

2. The machine tool according to claim 1 in which:
   said counterbalance means includes hydraulic means connected to said spindle carrier to exert the counterbalance force on said spindle carrier;
   and said control means controls said hydraulic means so that said hydraulic means exerts a substantially constant counterbalance force on said spindle carrier.

3. The machine tool according to claim 2 in which:
   said hydraulic means includes:
   a hydraulic pressure source;
   a cylinder;
   a piston movable in said cylinder;
   and connecting means connecting said piston to said spindle carrier;
   and said control means includes pressure control means to control the pressure of the hydraulic fluid supplied to said cylinder from said hydraulic pressure source to act on the side of said piston connected to said spindle carrier by said connecting means.

4. The machine tool according to claim 3 in which said pressure control means includes:
   sensing means for sensing the load on said spindle carrier;
   and changing means for changing the pressure of the hydraulic fluid supplied to said cylinder from said hydraulic pressure source in accordance with the load sensed by said sensing means.

5. The machine tool according to claim 4 in which said changing means includes:
   a hydraulic reducing and relieving valve to control the pressure of hydraulic fluid supplied to said cylinder from said hydraulic pressure source;
   and responsive means responsive to said sensing means to control said hydraulic reducing and relieving valve.

6. The machine tool according to claim 5 in which said responsive means includes:
   pilot operated means for controlling said hydraulic reducing and relieving valve;
   producing means having an inlet flow port connected to said hydraulic pressure source and an outlet flow port connected to said pilot operated means, said producing means including flow setting means producing a predetermined hydraulic pressure drop at said outlet flow port for a given flow setting;
   and selecting means to selectively bleed some of the hydraulic pressure at said outlet flow port of said producing means in response to said sensing means.

7. The machine tool according to claim 6 in which said selecting means includes valve means positioned in accordance with the load sensed by said sensing means to vary the amount of fluid bled.

8. The machine tool according to claim 7 in which said sensing means includes:
   a load cell attached to said spindle carrier to produce a signal proportional to the load on said spindle carrier;
   amplifying means for amplifying the signal from said load cell;
   and means for positioning said valve means of said selecting means in accordance with the signal from said amplifying means.

9. The machine tool according to claim 6 in which said sensing means includes:
   a load cell attached to said spindle carrier to produce a signal proportional to the load on said spindle carrier;
   amplifying means for amplifying the signal from said load cell;

and means for controlling said selecting means in accordance with the signal from said amplifying means.

10. The machine tool according to claim 5 in which said sensing means includes:
a load cell attached to said spindle carrier to produce a signal proportional to the load on said spindle carrier;
amplifying means for amplifying the signal from said load cell;
and means for controlling said responsive means in accordance with the signal from said amplifying means.

11. The machine tool according to claim 4 in which said sensing means includes:
a load cell attached to said spindle carrier to produce a signal proportional to the load on said spindle carrier;
amplifying means for amplifying the signal from said load cell;
and means for controlling said changing means in accordance with the signal from said amplifying means.

12. The machine tool according to claim 1 in which:
said control means includes sensing means for sensing the load on said spindle carrier;
and said sensing means includes:
a load cell attached to said spindle carrier to produce a signal proportional to the load on said spindle carrier;
amplifying means for amplifying the signal from said load cell;
and means for controlling the counterbalance force exerted by said counterbalance means to maintain the counterbalance force substantially constant in accordance with the signal from said amplifying means.

13. In combination:
vertically movable means;
motive means connected to said vertically movable means to move said vertically movable means in either vertical direction;
counterbalance means connected to said vertically movable means for exerting a counterbalance force on said vertically movable means in only one vertical direction as said vertically movable means is moved in either vertical direction by said motive means;
and control means for controlling said counterbalance means to cause said counterbalance means to exert a substantially constant counterbalance force on said vertically movable means in only the one vertical direction irrespective of the direction of vertical movement of said vertically movable means.

14. The combination according to claim 13 in which:
said counterbalance means includes hydraulic means connected to said vertically movable means to exert the counterbalance force on said vertically movable means;
and said control means controls said hydraulic means so that said hydraulic means exerts a substantially constant counterbalance force on said vertically movable means.

15. The combination according to claim 14 in which:
said hydraulic means includes:
a hydraulic pressure source;
a cylinder;
a piston movable in said cylinder;
and connecting means connecting said piston to said vertically movable means;
and said control means includes pressure control means to control the pressure of the hydraulic fluid supplied to said cylinder from said hydraulic pressure source to act on the side of said piston connected to said vertically movable means by said connecting means.

16. The combination according to claim 15 in which said pressure control means includes:
sensing means for sensing the load on said vertically movable means;
and changing means for changing the pressure of the hydraulic fluid supplied to said cylinder from said hydraulic pressure source in accordance with the load sensed by said sensing means.

17. The combination according to claim 16 in which said changing means includes:
a hydraulic reducing and relieving valve to control the pressure of hydraulic fluid supplied to said cylinder from said hydraulic pressure source;
and responsive means responsive to said sensing means to control said hydraulic reducing and relieving valve.

18. The combination according to claim 17 in which said responsive means includes:
pilot operated means for controlling said hydraulic reducing and relieving valve;
producing means having an inlet flow port connected to said hydraulic pressure source and an outlet flow port connected to said pilot operated means, said producing means including flow setting means producing a predetermined hydraulic pressure drop at said outlet flow port for a given flow setting;
and selecting means to selectively bleed some of the fixed hydraulic pressure at said outlet flow port of said producing means in response to said sensing means.

19. The combination according to claim 18 in which said selecting means includes valve means positioned in accordance with the load sensed by said sensing means to vary the amount of fluid bled.

20. The combination according to claim 19 in which said sensing means includes:
a load cell attached to said vertically movable means to produce a signal proportional to the load on said vertically movable means;
amplifying means for amplifying the signal from said load cell;
and means for positioning said valve means in accordance with the signal from said amplifying means.

21. The combination according to claim 18 in which said sensing means includes:
a load cell attached to said vertically movable means to produce a signal proportional to the load on said vertically movable means;
amplifying means for amplifying the signal from said load cell;
and means for controlling said selecting means in accordance with the signal from said amplifying means.

22. The combination according to claim 17 in which said sensing means includes:
a load cell attached to said vertically movable means to produce a signal proportional to the load on said vertically movable means;

amplifying means for amplifying the signal from said load cell;

and means for controlling said responsive means in accordance with the signal from said amplifying means.

23. The combination according to claim 16 in which said sensing means includes:
    a load cell attached to said vertically movable means to produce a signal proportional to the load on said vertically movable means;
    amplifying means for amplifying the signal from said load cell;
    and means for controlling said changing means in accordance with the signal from said amplifying means.

24. The combination according to claim 13 in which:
    said control means includes sensing means for sensing the load on said vertically movable means;
    and said sensing means includes:
    a load cell attached to said vertically movable means to produce a signal proportional to the load on said vertically movable means;
    amplifying means for amplifying the signal from said load cell;
    and means for controlling the counterbalance force exerted by said counterbalance means to maintain the counterbalance force substantially constant in accordance with the signal from said amplifying means.

* * * * *